United States Patent
Hwang et al.

(10) Patent No.: US 12,114,381 B2
(45) Date of Patent: Oct. 8, 2024

(54) FACILITATING A GEO-DISTRIBUTED DYNAMIC NETWORK SYSTEM FOR UBIQUITOUS ACCESS TO MULTIPLE PRIVATE NETWORKS

(71) Applicant: AT&T Intellectual Property I, L.P., Atlanta, GA (US)

(72) Inventors: Michael Hwang, New Providence, NJ (US); Varun Gupta, Mountain View, CA (US); Shu Shi, Summit, NJ (US); Christopher Rath, Hillsborough, NJ (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 490 days.

(21) Appl. No.: 17/546,380

(22) Filed: Dec. 9, 2021

(65) Prior Publication Data
US 2022/0104294 A1 Mar. 31, 2022

Related U.S. Application Data

(63) Continuation of application No. 16/439,184, filed on Jun. 12, 2019, now Pat. No. 11,229,076.

(51) Int. Cl.
*H04W 76/15* (2018.01)
*H04W 76/30* (2018.01)
*H04W 12/02* (2009.01)
*H04W 84/04* (2009.01)
*H04W 84/12* (2009.01)

(52) U.S. Cl.
CPC .......... *H04W 76/15* (2018.02); *H04W 76/30* (2018.02); *H04W 12/02* (2013.01); *H04W 84/042* (2013.01); *H04W 84/12* (2013.01)

(58) Field of Classification Search
None
See application file for complete search history.

(56) References Cited

U.S. PATENT DOCUMENTS

| 2015/0173111 A1 | 6/2015 | Agarwal et al. |
| 2016/0100023 A1 | 4/2016 | Kim |
| 2016/0183169 A1 | 6/2016 | Horn et al. |

OTHER PUBLICATIONS

Non-Final Office Action received for U.S. Appl. No. 16/439,184 dated Oct. 29, 2020, 19 pages.
Final Office Action received for U.S. Appl. No. 16/439,184 dated May 13, 2021, 19 pages.

*Primary Examiner* — Minh Trang T Nguyen
(74) *Attorney, Agent, or Firm* — Guntin & Gust, PLC; Mark Wilinski

(57) ABSTRACT

Facilitating geo-distributed dynamic network system for ubiquitous access to multiple private networks in advanced networks (e.g., 4G, 5G, and beyond) is provided herein. Operations of a method can comprise establishing, by a system comprising a processor, a first communication link between a first network device and group of devices connected via a private network connection. The method also can comprise establishing, by the system, a second communication link between the first network device and a second network device. The second network device can be included in a group of network devices associated with a communication network provider. Further, the second network device can facilitate communication with a communication device.

20 Claims, 10 Drawing Sheets

FACILITATING A GEO-DISTRIBUTED DYNAMIC NETWORK SYSTEM FOR UBIQUITOUS ACCESS TO MULTIPLE PRIVATE NETWORKS

RELATED APPLICATION

The subject patent application is a continuation of, and claims priority to, U.S. patent application Ser. No. 16/439,184, filed Jun. 12, 2019, and entitled "FACILITATING A GEO-DISTRIBUTED DYNAMIC NETWORK SYSTEM FOR UBIQUITOUS ACCESS TO MULTIPLE PRIVATE NETWORKS," the entirety of which application is hereby expressly incorporated by reference herein.

TECHNICAL FIELD

This disclosure relates generally to the field of network communicating and, more specifically, to facilitating access to multiple private networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
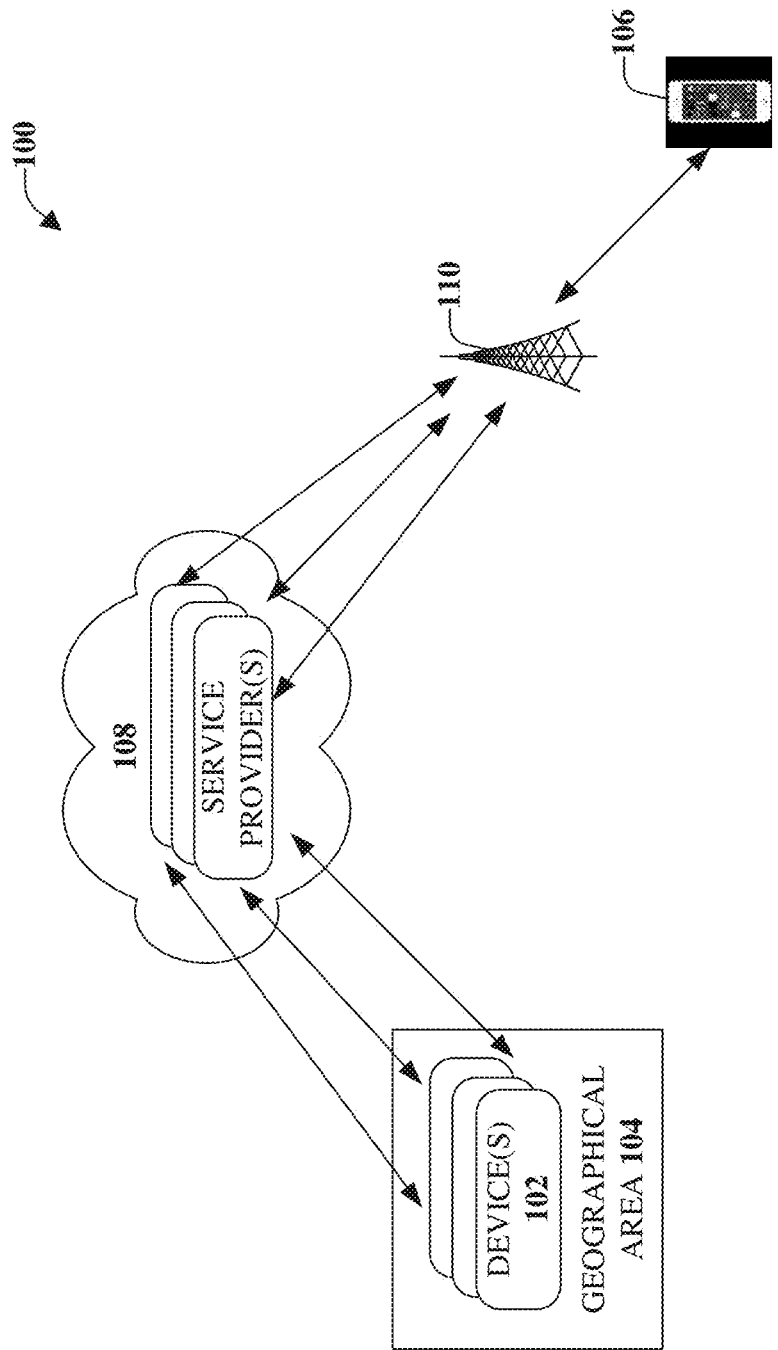
FIG. 1 illustrates an example, non-limiting system that utilizes the public Internet to provide connectivity to various devices.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate a geo-distributed dynamic network system for ubiquitous access to multiple private networks, which can be advanced networks. Traditionally, mobile users are only able to access private devices through the public Internet. In order to access home devices that run on their private networks (e.g., home, car, office, and so on), the user must rely on either sophisticated networking setups or Internet companies. Connectivity is either through the public Internet, which is insecure, or through dedicated networking, which is expensive and limited. Sophisticated networking setups are costly, require a high-level of technical expertise, and suffer high latency. An example of a sophisticated networking setup is a personal Virtual Private Network (VPN) which would require running a private VPN server in the public Internet and running a VPN client on every device/network that a user wishes to access. There can be issues related to trust, privacy, security, high bandwidth usage, high latency, and fragmentation of the user's data when relying on Internet companies. An example of this is a "smart" doorbell. The user would install their device and connect it to their home network. The device would connect directly to the provider's Application Program Interfaces (APIs) in the public Internet to push data and to receive control directives. The user would access their doorbell through a mobile app that communicates with the provider's APIs in the public Internet. As the user moves (e.g., goes from home to work), the VPN connection is lost. However, with the disclosed aspects, the user can be provided with a connection that seamlessly retains connectivity as the user (and associated device) moves between locations.

Advanced networks are about connecting to a rapidly increasing number of devices. The disclosed aspects provide an application of the next generation communication network to provide users with better access to their private devices and networks in a new way. For example, the disclosed aspects can be responsible for constructing and maintaining a reliable, low latency private network between a mobile user and his/her private devices that are geo-distributed and running on private networks. The private network transparently updates as the mobile user and private devices move geographically. Thus, the disclosed aspects can provide users with valuable access to all their connected devices without having to sacrifice their privacy and security. There are more and more news stories about computer privacy and security issues and will grow further as more things become "smarter". The various aspects discussed herein provide solutions to provide users convenience securely.

The disclosed aspects can provide mobile users direct access to their private devices and networks by running a point-to-point virtual network that plugs into the cellular network. Communication network sites (e.g., towers, central offices, and so on) can be edge compute sites. A network function responsible for bridging each user's private networks and giving the user's mobile device connectivity to them would be running across all the geo-distributed edge compute sites. This network function would be responsible for dynamically constructing the lowest latency network path for the user as the user moves around geographically and hops from tower to tower. The user can be provided with an on-premises device, referred to as a gateway device, to connect his/her private network or devices to this virtual network. This gateway device can communicate directly with the nearest site that is running the bridging network function. The user can use a mobile application to control membership of those on-premises gateways, to control access for other users to the same virtual network, and to interact with the edge compute sites.

With the various aspects disclosed herein, mobile users can gain seamless, low latency, direct access to their private devices and networks without having to give up privacy and security. This is increasingly important as homes, vehicles, offices, and cities become smarter and as users become more and more surrounded by devices (e.g., Internet-of-Things (IoT) devices and other devices) that they would like to connect with and access. Accordingly, the disclosed aspects can provide a higher-level service to users on their upgraded network (e.g., upgraded with edge compute), which can be placed strategically as a mobile user's connected-everything hub.

According to an embodiment, provided is a system that can comprise a processor and a memory that stores executable instructions that, when executed by the processor, facilitate performance of operations. The operations can comprise facilitating a first connection with a group of devices associated with a defined geographic area. The operations also can comprise facilitating a second connection to a second network device via a cellular network. The second connection can facilitate access to the group of devices by a communication device.

In an example, facilitating the second connection can comprise bypassing a public Internet network connection. Further to this example, the first network device can be an edge gateway device located within a first proximity of the defined geographic area. The second network device can be an edge bridge device located within a second proximity of a third network device that facilitates communication with the communication device. The third network device can be included in a group of network devices, excluding the first network device.

According to some implementations, the operations can comprise determining a location of the communication device. The operations also can comprise disabling the second connection to the second network device based on a determination that the location of the communication device is within the defined geographic area.

In some implementations, a mobile routing application can be executing on the communication device. Further, to these implementations, facilitating the second connection to the second network device can comprise facilitating the second connection based on the mobile routing application executing on the communication device. In addition, the operations can comprise routing a first group of network traffic via the second connection. The first group of network traffic can be first network traffic associated with the group of devices. The operations also can comprise routing a second group of network traffic via a Wi-Fi network. The second group of network traffic can be second network traffic associated with other devices other than the group of devices.

Facilitating the second connection to the second network device can comprise, according to some implementations, facilitating the second connection between a private communication network associated with the defined geographic area and the cellular network.

In an example, at least one device of the group of devices can be classified as an Internet-of-Things device. In another example, the second connection can comprise a connection configured to operate according to a fifth generation wireless network communication protocol.

Another embodiment can relate to a method that can comprise establishing, by a system comprising a processor, a first communication link between a first network device and group of devices connected via a private network connection. The method also can comprise establishing, by the system, a second communication link between the first network device and a second network device. The second network device can be included in a group of network devices associated with a communication network provider. Further, the second network device can facilitate communication with a communication device.

In an example, prior to establishing the first communication link, the method can comprise determining, by the system, that a device accessibility application is executing on the communication device. In another example, prior to establishing the second communication link, the method can comprise determining, by the system, the communication device is located outside a communication range of the private network connection.

According to some implementations, the method can comprise disabling, by the system, the second communication link based on a determination that the communication device has moved within a communication range of the private network connection.

In accordance with some implementations, the method can comprise switching, by the system, a networking mode between a remote site and a local site. The second network device can be associated with the remote site. The group of devices can be associated with the local site.

The first network device and the group of devices can be located within a defined geographic area, according to some implementations. Further, establishing the second communication link can comprise establishing the second communication link via a cellular communications network.

In accordance with some implementations, establishing the second communication link can comprise bypassing a public Internet network connection. According to some implementations, establishing the second communication link can comprise establishing the second communication link via a communication link configured to operate according to a fifth generation wireless network communication protocol.

Another embodiment can relate to a machine-readable storage medium, comprising executable instructions that, when executed by a processor, facilitate performance of operations. The operations can comprise establishing a first communication connection between a first network device and a group of communication devices. The first network device can be located within a defined range of the group of communication devices and communicate via a private communication network. Further, the operations can comprise establishing a second communication connection between the first network device and a second network device comprising bypassing a public Internet network connection. The second network device can communicate with a user equipment device determined to be associated with the private communication network.

According to some implementations, the operations can comprise determining a location of the user equipment device. Further, the operations can comprise disabling the second communication connection to the second network device based on a determination that the location of the user equipment device is within the defined range.

In some implementations, establishing the second communication connection to the second network device can comprise facilitating the second communication connection based on a mobile routing application executing on the user equipment device.

Advanced networks can provide expanded computing capabilities, particularly in the home where users are introducing many different types of devices. For example, various devices (including IoT devices) can help automate portions of the home (e.g., turn on lights, control thermostat, and so on). Therefore, access and how to connect to these devices outside the home (e.g., turn on the light from outside the home, control the thermostat remotely from outside the home, and so on) has arisen and solutions are provided with the various aspects discussed herein.

In a traditional model, the devices connect to services in the cloud (e.g., sitting in the Internet), which raises privacy concerns as discussed above. Another concern is hackers or other rogue entities being able to remotely control these devices in an unauthorized manner. Let alone all the privacy data being uploaded (to the Internet service providers) and no control with respect with what is being done with the privacy data. Accordingly, the disclosed aspects provide an architecture that addresses how to provide a means to remotely connect to the devices (including the IoT devices) safely without sacrificing privacy.

In accordance with various aspects, edge computing can be utilized where users can be provided a means to connect directly to private devices in their home (or other area) without having to go through the Internet. For example, the private devices can be network enabled devices. Thus, the disclosed aspects can allow users to maintain a direct connection to their home (e.g., devices) in a private fashion by creating private ad hoc networks through the cellular infrastructure. As discussed herein, edge computing includes one or more edge devices, which can be any device or compute that is not in the "cloud." In an example, an edge device could be an eNodeB, a central office, the user's home, and even a mobile device could be considered an edge device. The edge devices are devices that can communicate locally without going through the Internet (although it could be possible that the devices can be configured to communicate, at least in part, through the Internet).

As discussed herein, an edge gateway device is a device that links one or more devices (e.g., IoT devices, personal storage, and so on) together and also links the devices into a private network. Also provided are edge bridge devices that run in the eNodeB site and can maintain network connectivity between the edge gateway device and the end user's device (e.g., user equipment (UE) device). From the user's perspective, the user equipment device can seamlessly maintain direct connectivity to their home devices. This can be achieved as discussed herein without storing anything in the cloud or communicating over the Internet (or minimizing the amount of communication conducted over the Internet).

The UE device can be moved (e.g., as the user is traveling to work) and is handed off between access points and between associated edge bridge devices. For example, a UE device within a home network can access the local edge gateway device through the home network. The UE device can access the remote private devices connected to the home network through the local edge gateway device via the edge bridge device. When the UE device is moved from the home network to another network (e.g., LTE network, 5G network, another advanced network), the UE device can access all edge gateway devices through the nearest edge bridge device. Further, as the UE device is moved between networks (e.g., from a first LTE site to a second LTE site), intelligent network adjustments can be implemented. For example, a first edge bridge device can forward edge gateway device traffic to a second edge bridge device (e.g., the next edge bridge device). The edge bridge device session can be moved to a more common compute center (e.g., center office, cloud).

The user (e.g., through their device and/or through a mobile routing application) can register with the service and can register their devices with the service. According to some implementations, the devices can be registered automatically based on a search function associated with the mobile routing application.

In further detail, FIG. 1 illustrates an example, non-limiting system 100 that utilizes the public Internet to provide connectivity to various devices. Illustrated are one or more devices 102 located at a defined area or defined geographic location 104. For example, the defined geographic location 104 can be a home (e.g., a "smart" home), a business, connected vehicles, "smart" cities, or another location that comprises the one or more devices 102 associated with a user or a group of users. By way of example and not limitation, the one or more devices 102 can comprise smart hubs, personal storage, IoT devices, and other devices. Further, the one or more devices 102 can comprises at least one UE device 106 that can be moved to a location outside the defined geographic location 104.

Connectivity between the one or more devices 102 and at least one UE device 106 can be enabled (when the at least one UE device 106 is away from the defined geographic location 104) via the public Internet 108 and an access point 110. The public Internet 108 can provide a connection via one or more service providers. Users associated with the one or more devices 102 upload all data to the service providers via the public Internet 108. The at least one UE device 106, in order to gain connectivity to the one or more devices 102, is to be signed-in per service provider (of the one or more service providers) to access the one or more devices 102. For example, to gain communication connectivity to devices located in a user's home, the user (via their UE device) has to sign into (or authenticate with) their service provider to gain access and communication capabilities to the devices in their home.

For example, users can connect to their home devices and personal data remotely via their mobile phone. The user home devices can be connected directly to the Internet companies. Personal data can be streamed or copied to those Internet companies into the cloud. The Internet companies can provide users with access to the users' own devices and/or data. In this scenario, the Internet companies have control over the data (e.g., user data, access, and features). Further, the Internet companies have to deal with scaling issues (e.g., the ability to handle more users and/or less users based on system demands.) In addition, the user has to trust the Internet companies and/or their designed third parties with security issues and/or from profits made from selling the data of the user (if such practices are employed by the Internet companies). Thus, for convenience of gaining access to their devices, users give up privacy and control and can suffer fragmentation of services and/or data.

Figure 2:
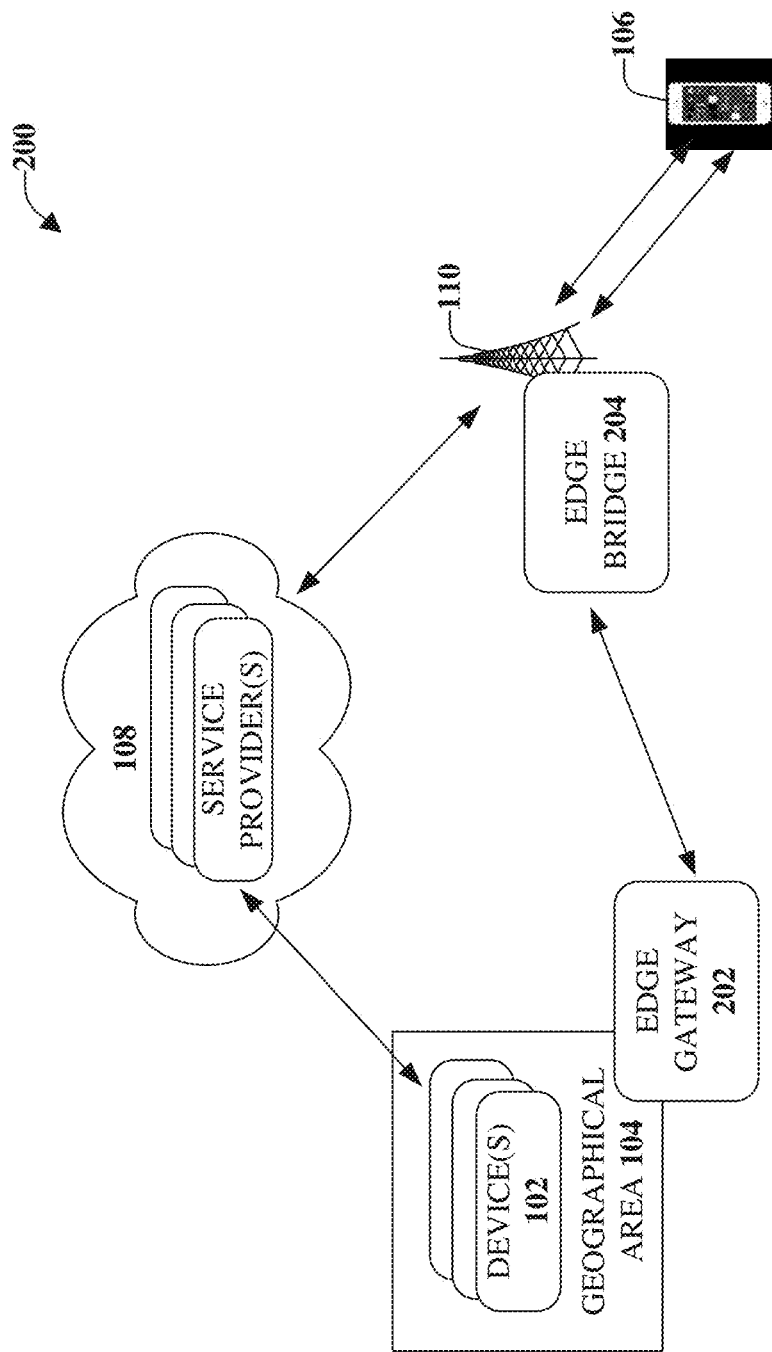
FIG. 2 illustrates an example, non-limiting, system that utilizes a cellular network infrastructure to provide connectivity to various devices in accordance with one or more embodiments described herein.

FIG. 2 illustrates an example, non-limiting, system 200 that utilizes a cellular network infrastructure to provide connectivity to various devices in accordance with one or more embodiments described herein. Repetitive description of like elements employed in other embodiments described herein is omitted for sake of brevity.

As illustrated, the system 200 can comprise an edge gateway device 202 located at or near the defined geographic location 104 (e.g., within communication capability of the one or more devices 102). The system 200 can also comprise an edge bridge device 204 located at or near the access point 110.

The edge bridge device 204 can be utilized to bridge all user's private networks that sit behind the edge gateway device 202 and can provide a route between the private networks and the Internet. Further, the edge bridge device 204 can be meshed together with other edge bridge devices, as will be discussed further below with respect to FIG. 4.

A user (or more than one user) can connect to their home devices and/or personal data remotely via their mobile phone (e.g., the at least one UE device 106). It is noted that although discussed with accessing remotely via a mobile phone, the disclosed aspects are not limited to this implementation, and other devices can be utilized to facilitate the remote access.

Thus, devices of the one or more devices 102 can connect to the edge gateway device 202. It is noted that the edge gateway device 202 can be positioned locally (e.g., near the defined geographic location 104 and/or the one or more devices 120). The edge gateway device 202 can facilitate dynamic creation of a private, local area network over a cellular network infrastructure. The edge gateway device 202 can also facilitate maintenance of the private, local area network over a cellular network infrastructure. Based on the private, local area network available over the cellular network infrastructure, the user (e.g., through their communication device) seamlessly can access their home devices via the mobile device from any location on the cellular network.

According to some implementations, the edge gateway device 202 can facilitate the creation and maintenance of the private, local area network as a standalone device. In some implementations, the edge gateway device 202 can facilitate the creation and maintenance of the private, local area network with at least one other device (e.g., in conjunction with one or more devices of the cellular network infrastructure).

As discussed herein users can maintain their privacy and control. Further, users are not required to register and sign-in to Internet companies. The disclosed aspects also provide seamless and faster experience for users. In addition, enhanced security can be enabled since devices are not always connected to the Internet. Thus, the disclosed aspects provide a better model for users to safely connect everything, enabling the development of a new, richer ecosystem.

Figure 3:
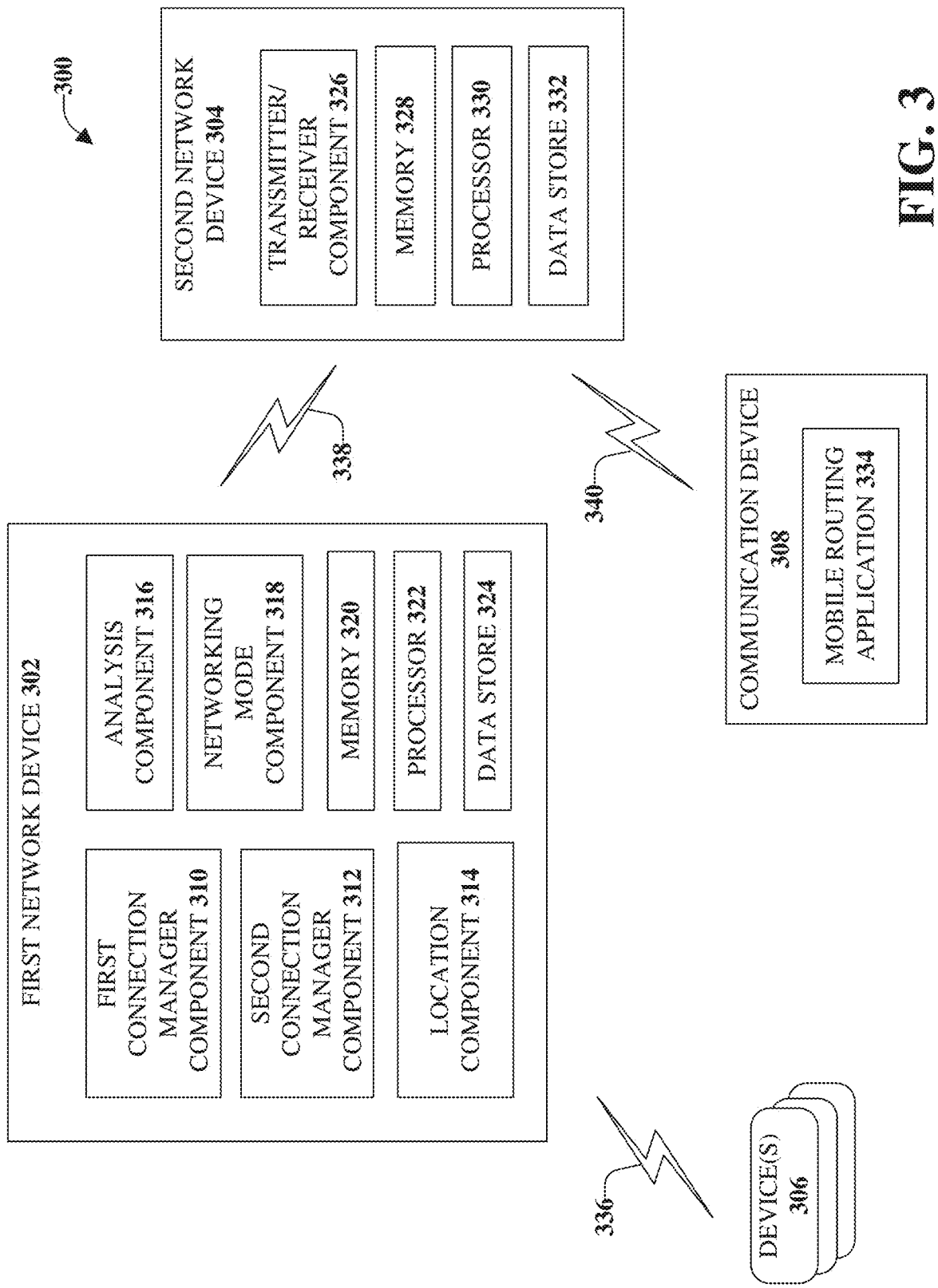
FIG. 3 illustrates an example, non-limiting, system for facilitating a geo-distributed dynamic network system for ubiquitous access to multiple private networks in advanced networks in accordance with one or more embodiments described herein.

FIG. 3 illustrates an example, non-limiting, system 300 for facilitating a geo-distributed dynamic network system for ubiquitous access to multiple private networks in advanced networks in accordance with one or more embodiments described herein. Aspects of systems (e.g., the system 300 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 300 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 300 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 3, the system 300 can include a first network device 302, a second network device 304, a group of devices 306, and a communication device 308. The group of devices 306 can be associated with a defined geographic area (e.g., the defined geographic location 104). According to some implementations, the first network device 302 can be an edge gateway device (e.g., the edge gateway device 202) located within a first proximity of defined geographic area (e.g., the defined geographic location 104).

In further detail, the first network device 302 (e.g., the edge gateway device) can be utilized as a gateway between a user's private network and a cellular network. Further, the first network device 302 can interface with the user (e.g., the user device) via the mobile routing application for registration (e.g., tie the gateway to an International Mobile Station Equipment Identity (IMSEI), access control (e.g., multi-user support), and/or policy changes (e.g., Quality of Service (QoS)). For example, the policy changes could be related to changes on the cellular network and/or policies implemented by the end user. For example, the policy changes could be cellular network changes where a cellular network infrastructure might be backed up. Therefore, a device of the cellular network could make changes on the gateway to maintain a level of service of the user and the user is unaware of the change. Another use case is for the user to be able to make policy changes, which could be, for example, if there is a video camera for surveillance versus some other devices that are used to monitor the home, the user might want to make the video surveillance more important in terms of network usage (e.g., assign the video surveillance a higher priority). Accordingly, a policy could be related to prioritization related to bandwidth limitations, for example.

According to some implementations, the second network device 304 can be an edge bridge device (e.g., the edge bridge device 204) and can be located within a second proximity of a third network device (e.g., the access point 110) that facilitates communication with the communication device 308. The third network device can be included in a group of network devices (excluding the first network device). Further, network devices in the group of network devices can be associated with respective edge bridge devices.

The first network device 302 can connect to a nearest edge bridge device (e.g., the second network device 304) based on registration. In some implementations, the first network device 302 can listen for networking directives provided by the second network device 304 According to some implementations, the first network device 302 can facilitate switching networking modes between being a remote site and being a local site from the user's perspective. In addition, the first network device 302 can manage higher-order applications and/or functions (hub).

The first network device 302 can include a first connection manager component 310, a second connection manager component 312, a location component 314, an analysis component 316, a networking mode component 318, at least one memory 320, at least one processor 322, and at least one data store 324. The second network device 304 can comprise a transmitter/receiver component 326, at least one memory 328, at least one processor 330, and at least one data store 332. The communication device 308 can comprise a mobile routing application 334. The mobile routing application 334 can be installed on the communication device 308 and can be executing on the communication device 308. Further, the communication device 308 and devices of the group of devices 306 can comprise respective memories, processors, and data stores (not shown for purposes of simplicity).

The first connection manager component 310 can facilitate a first connection 336 with the group of devices 306. The first connection 336 can be a communication link, which can be a private network connection (e.g., a home networking connection). The communication device 308 can be associated with the group of devices 306 and can be a device included in a home networking group of the home networking connection. Thus, when the communication device 308 is located in the home, for example, the communication device 308 can be a device included with the group of devices 306 and can communicate with the first connection manager component 310 (and with the other devices in the group of devices 306) via the first connection 336.

The second connection manager component 312 can facilitate a second connection 338 with the second network device 304. The second connection 338 can be a communication link and can facilitate access to the group of devices 306 by the communication device 308 (via a third connection 340) when the communication device 308 is located remotely from an area associated with the group of devices 306. The access can include communicating with the group of devices 306, controlling devices of the group of devices 306, and/or performing other functions related to communications between the group of devices 306 and the communication device 308.

According to some implementations, the second connection 338 can be a communication link established via a cellular network. By facilitating the second connection 338 between the first network device 302 and the second network device 304 via the cellular network, the second connection manager component 312 can bypass a public Internet network connection (e.g., the public Internet 108).

Thus, the first network device 302 (e.g., via the first connection manager component 310 and the second connection manager component 312) can be responsible to connect the home network and its internal devices and communicatively couple those devices to the private network established via the cellular network infrastructure. It is noted that other responsibilities of the first network device 302 can include, but are not limited to, controlling registration and/or providing access control and policy control.

As mentioned, the second connection 338 can be established based on the communication device 308 being located remotely from the location of the group of devices 306. For example, the location component 314 can monitor a location of the communication device 308. In some cases, the location component 314 can determine that the communication device 308 is within a communication range of the first network device 302 and/or the group of devices 306. In this case, the networking mode component 318 can switch a network mode of the first network device 302 and/or the communication device 308 between a remote site and a local site. The local site can be defined based on the defined geographic area and the remote site can be defined as locations outside the defined geographic area.

The analysis component 316 can determine whether the mobile routing application 334 is executing on the communication device 308 (e.g., through the exchange of information, by receiving information from the communication device 308, and so on). The mobile routing application 334 can be utilized to register and manage edge gateways to the user's mobile device and a cellular network account. Further the mobile routing application 334 can be utilized with edge bridge devices to maintain a private connection. For example, information can be extracted to help the edge bridge devices make better decisions with respect to network changes. Further, the mobile routing application 334 can perform local routing. Specifically, in the case where the user in on a public Wi-Fi, the mobile routing application 334 can split traffic between a private network and a public network (e.g., an LTE network, 5G or another advanced network (private) and a Wi-Fi network (everything else)). Further, the mobile routing application 334 can install edge applications on-demand (e.g., 360 server-side).

It is noted that although a single communication device is illustrated and described, the disclosed aspects are not limited to this implementation. Instead, there can be more than one communication device that is located remote from the defined geographic area. For example, a first user (e.g., husband) and a second user (e.g., wife) can be at different locations (e.g., different job sites) and, therefore, a first private communication link can be established for the first user and a second private communication link can be established for the second user (e.g., via the first connection manager component 310).

Further, although discussed with respect to a defined geographic area, the disclosed aspects are not limited to this implementation. Instead, the group of devices could be devices located at different locations and registered with the mobile routing application 334 as being devices that are related to one another. For example, a first group of devices could be associated with a user's home, a second group of devices could be associated with a vehicle, a third group of devices could be associated with another house (e.g., a relative's house, a friend's house), and a fourth group of devices could be associated with the user's work location. Respective edge gateway devices can be installed at the different locations and can be communicatively coupled to provide remote access from one or more user equipment devices as discussed herein.

Figure 4:
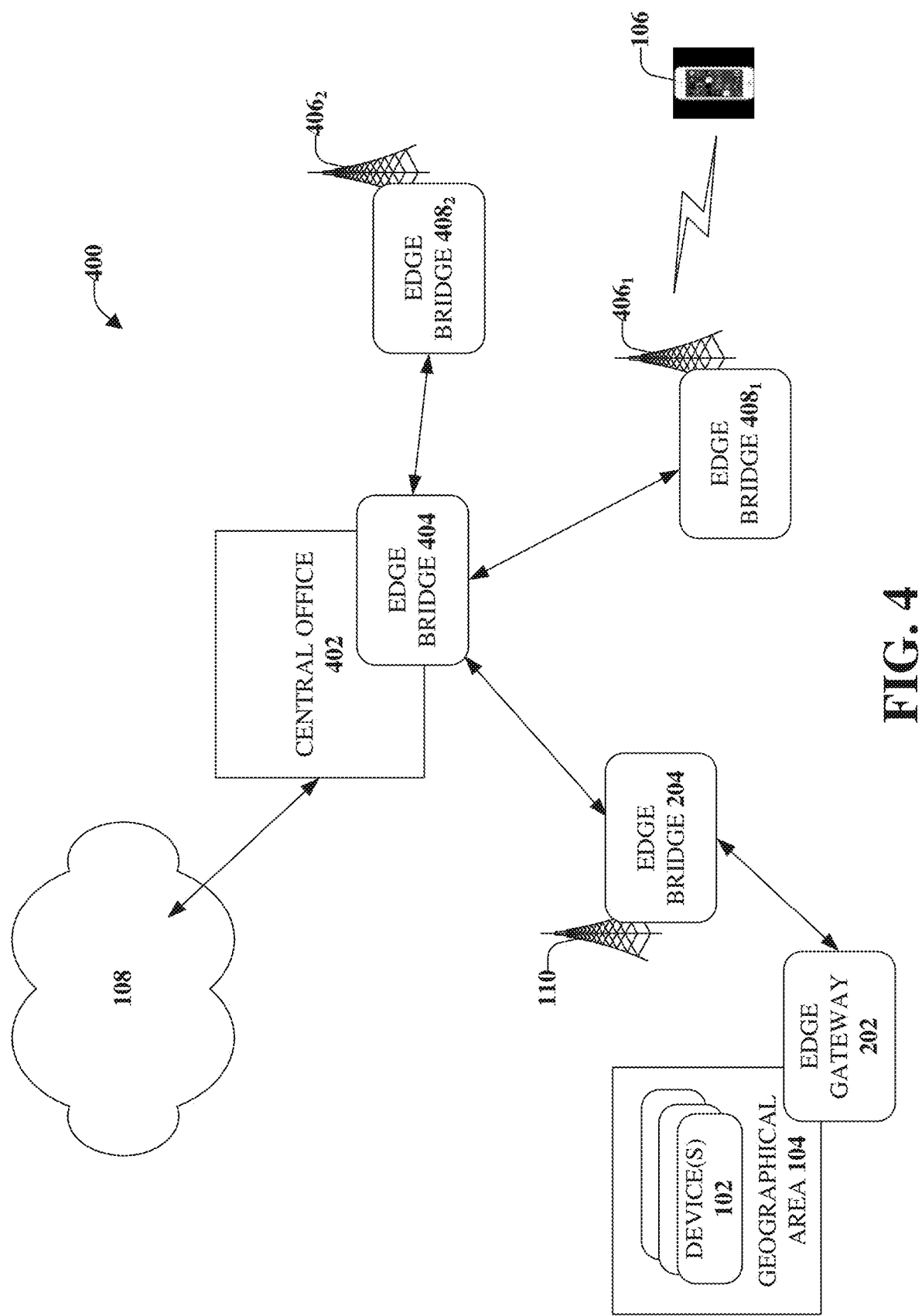
FIG. 4 illustrates an example, non-limiting system that utilizes a cellular network infrastructure to provide connectivity to devices located in different geographic areas in accordance with one or more embodiments described herein.

Further, although discussed with respect to a single edge bridge device, the disclosed aspects can be utilized with multiple edge bridge devices, as a function of a location of the communication device 308 (or more than one communication device). For example, FIG. 4 illustrates an example, non-limiting system 400 that utilizes a cellular network infrastructure to provide connectivity to devices located in different geographic areas in accordance with one or more embodiments described herein. Repetitive description of like elements employed in other embodiments described herein is omitted for sake of brevity.

As illustrated the at least one UE device 106 can be located more than one hop away from the defined geographic location 104. In this example, there is a central office 402 and associated edge bridge device 404 as well as a first access point 406₁ and associated first edge bridge device 408₁ between the at least one UE device 106 and the access point 110. Also illustrated are a second access point 406₂ and associated second edge bridge device 408₂. As the at least one UE device 106 is moved throughout a communication network, the second communication link can be transferred seamlessly between access points/edge bridge devices to maintain the connection in a seamless manner.

As depicted in FIG. 4, the edge bridge devices can be meshed together. The edge bridge device mesh can dynamically create/maintain networks that are the shortest network distance and retain the lowest latency for the user's collection of private networks to the user (e.g., the at least one UE device 106, the communication device 308). Edge bridge devices can be distributed across the different cellular provider sites (e.g., tower to central office). Further, the edge bridge devices can tract the user (e.g., the user device) and can make appropriate network changes with minimal impact to the user experience. In addition, the edge bridge devices can provide some level of compute that could be used for general purpose applications (e.g., 360 server side). The edge bridge devices can be meshed together with the private network (e.g., the second connection 338) is maintained for each individual user (e.g., the communication device 308) as the user moves around geographically.

With continuing reference to FIG. 3, the mobile routing application 334 can be configured to route traffic associated with the second connection 338 different from other traffic that might be sent to/from the communication device 308. For example, the communication device 308 could be in a coffee shop and connect to the wi-fi within the coffee shop. Thus, by default the network traffic from the communication device 308 could be routed through the wi-fi network. However, the network traffic associated with the one or more devices 306 should be maintained with the private network (e.g., the second connection 338). Accordingly, the mobile routing application 334 can direct the traffic to connect to devices at home, to be maintained via the second connection 338 (e.g., the LTE channel, the 5G channel, and so on) instead of being routed through the coffee shop wi-fi channel. Thus, a first group of network traffic can be routed through the wi-fi and a second group of network traffic can be routed through the LTE channel. In this manner, the communication device 308 (e.g., the user) can be able to seamlessly maintain connectivity to the home that is uninterrupted.

Further, the first network device 302 can be configured to switch networking nodes between a remote site (e.g., via the second network device 304 and/or subsequent network devices) and the local networking site (e.g., via the first network device 302). For example, when the user comes home (e.g., the communication device 308 is returned to the vicinity of the first network device 302), active networking can be performed to directly connect the communication device 308 to the home network (e.g., the first network device 302) because the connection to the second network device 304 is no longer relevant.

Accordingly, the location component 314 can determine the current location of the communication device 308 and provide a notification to the components of the first network device 302 of the location. Accordingly, the first connection manager component 310 can implement a first mode of operation and the second connection manager component 312 can implement a second mode of operation. For example, the first mode of operation can be to connect the communication device 308 to a local wi-fi (e.g., in the house and controlled by the first network device 302) and the second mode of operation can be to connect the communication device 308 to the eNodeB (e.g., the second network device 304). The determination of the mode of operation can be based on maintaining the best network connectivity for the communication device 308.

According to some implementations, the first network device 302 (e.g., the edge gateway device 202) can manage higher order applications and functions. It is noted that the primary responsibility can be to connect the devices in the home and provide remote users direct access to the devices through the second connection 338 (e.g., the cellular network).

Another level of feature provided by the first network device 302 (e.g., the edge gateway device 202) is to provide the user the ability to install more sophisticated software onto the edge gateway device and to perform more advanced data processing for the user. For example, if there is a video surveillance camera at home, an application could be installed onto the edge gateway device that takes the video surveillance that is streamlining into edge gateway device and be able to perform various functions (e.g., image recognition on the stream, license plate reading, and so on). Further, the user (e.g., via the communication device 308) can be provided the option to perform various functions, such as turning on the video surveillance feed when someone walks past this camera, automatically storing the image, sending the image electronically to a designated recipient, and so on. This is a higher order application or function that the user can install onto the edge gateway device.

The communication components (e.g., the first connection manager component 310, the second connection manager component 312, the transmitter/receiver component 326) can be configured to transmit to, and/or receive data from, the first network device 302, the second network device 304, other network devices, the communication device 308, devices of the group of devices 306, and/or other communication devices. Through the first connection manager component 310 and/or the second connection manager component 312 the first network device 302 can concurrently transmit and receive data, can transmit and receive data at different times, or combinations thereof. Through the transmitter/receiver component 326, the second network device 304 can concurrently transmit and receive data, can transmit and receive data at different times, or combinations thereof.

The at least one memory 320 can be operatively connected to the at least one processor 322. The at least one memory 320 can store executable instructions that, when executed by the at least one processor 322 can facilitate performance of operations. Further, the at least one processor 322 can be utilized to execute computer executable components stored in the at least one memory 320 and/or the at least one data store 324.

For example, the at least one memory 320 can store protocols associated with facilitating a geo-distributed dynamic network system for ubiquitous access to multiple private networks in advanced networks as discussed herein. Further, the at least one memory 320 can facilitate action to control communication between the first network device 302, the second network device 304, other network devices, the group of devices 306, and/or other UE devices, such that the first network device 302 can employ stored protocols and/or algorithms to achieve improved communications in a wireless network as described herein.

Further, the at least one memory 328 can be operatively connected to the at least one processor 330. The at least one memory 328 can store executable instructions that, when executed by the at least one processor 330 can facilitate performance of operations. Further, the at least one processor 330 can be utilized to execute computer executable components stored in the at least one memory 328 and/or the at least one data store 332.

For example, the at least one memory 328 can store protocols associated with facilitating a geo-distributed dynamic network system for ubiquitous access to multiple private networks in advanced networks as discussed herein. Further, the at least one memory 328 can facilitate action to control communication between the second network device 304, the first network device 302, other network devices, the at least one UE device 106, and/or other user equipment devices, such that the second network device 304 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 322 can facilitate respective analysis of information related to a geo-distributed dynamic network system for ubiquitous access to multiple private networks in advanced networks. The at least one processor 322 can be a processor dedicated to analyzing and/or generating information received, a processor that controls one or more components of the first network device 302, and/or a processor that both analyzes and generates information received and controls one or more components of the first network device 302.

In addition, the at least one processor 330 can facilitate respective analysis of information related to a geo-distributed dynamic network system for ubiquitous access to multiple private networks in advanced networks. The at least one processor 330 can be a processor dedicated to analyzing and/or generating information received, a processor that controls one or more components of the second network device 304, and/or a processor that both analyzes and generates information received and controls one or more components of the second network device 304.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

It is noted that although discussed with respect to 5G, the disclosed aspects can be extended to other technologies beyond 5G. For example, 6G integrates a number of access technologies to create universal coverage and always-on broadband global network, including, for example, more integrated terrestrial wireless with satellite systems in the access network. As discussed herein, provided is a latency discovery mechanism using enhanced "traceroute" to estimate the user plane latency performance between the UE (or other device) and application server across various access technologies (e.g., LTE, 5G, WiFi, Wireline, and satellite).

Through implementation of the disclosed aspects, barriers to entry for IoT companies can be lower. For example, IoT companies will not need to build a complete stack (e.g., hardware, software on device, software in the cloud, mobile application, and so on). Further, the IoT companies do not have to build to scale.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
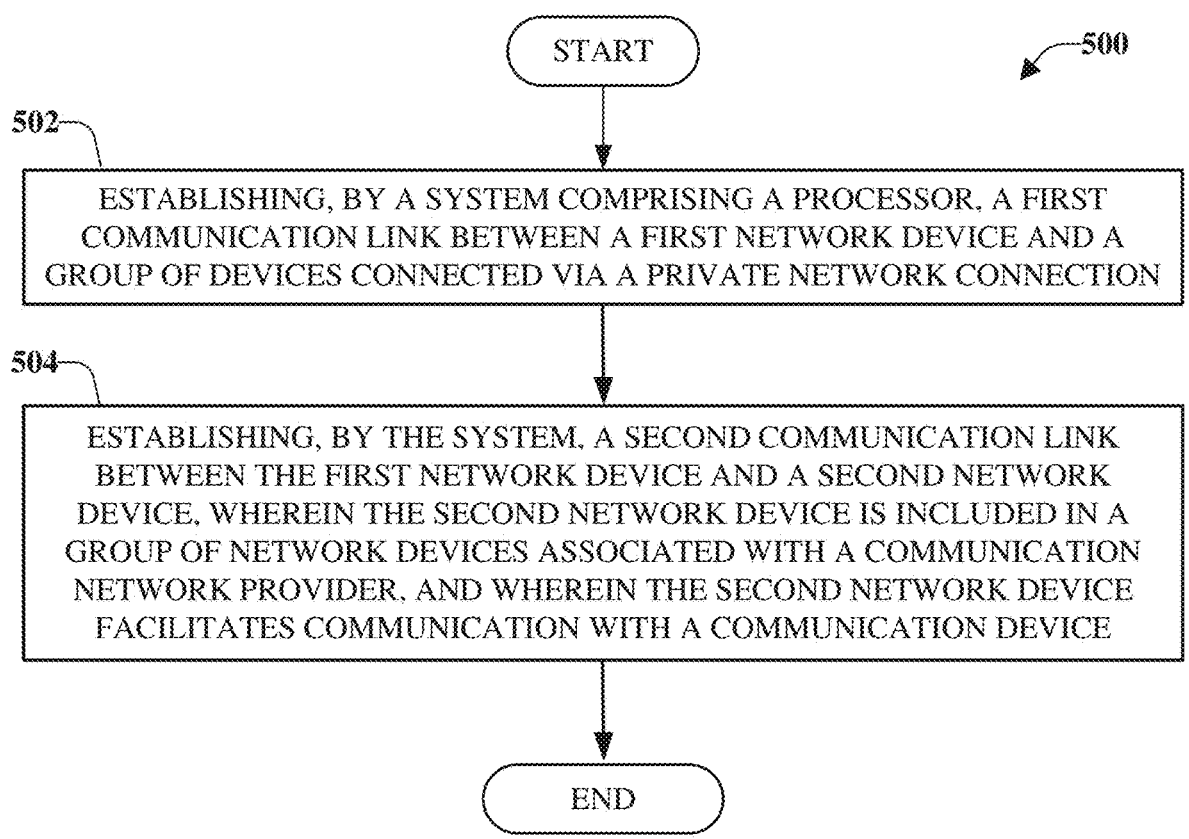
FIG. 5 illustrates a flow diagram of an example, non-limiting, computer-implemented method for facilitating a geo-distributed dynamic network system for ubiquitous access to multiple private networks in advanced networks in accordance with one or more embodiments described herein.

FIG. 5 illustrates a flow diagram of an example, non-limiting, computer-implemented method 500 for facilitating a geo-distributed dynamic network system for ubiquitous access to multiple private networks in advanced networks in accordance with one or more embodiments described herein.

Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a system comprising a processor can establish a first communication link between a first network device and a group of devices connected via a private network connection (e.g., via the first connection manager component 310). Further, at 504 of the computer-implemented method 500, the system can establish a second communication link between the first network device and a second network device (e.g., via the second connection manager component 312). According to some implementations, the second network device can be included in a group of network devices associated with a communication network provider. Further, the second network device can facilitate communication with a communication device (e.g., the at least one UE device 106, the communication device 308).

The first network device and the group of devices can be located within a defined geographic area. In addition, establishing the second communication link can comprise establishing the second communication link via a cellular communications network. Further, establishing the second communication link can comprise bypassing a public Internet network connection. In some implementations, the second communication link can be established via a communication link configured to operate according to a fifth generation wireless network communication protocol.

Figure 6:
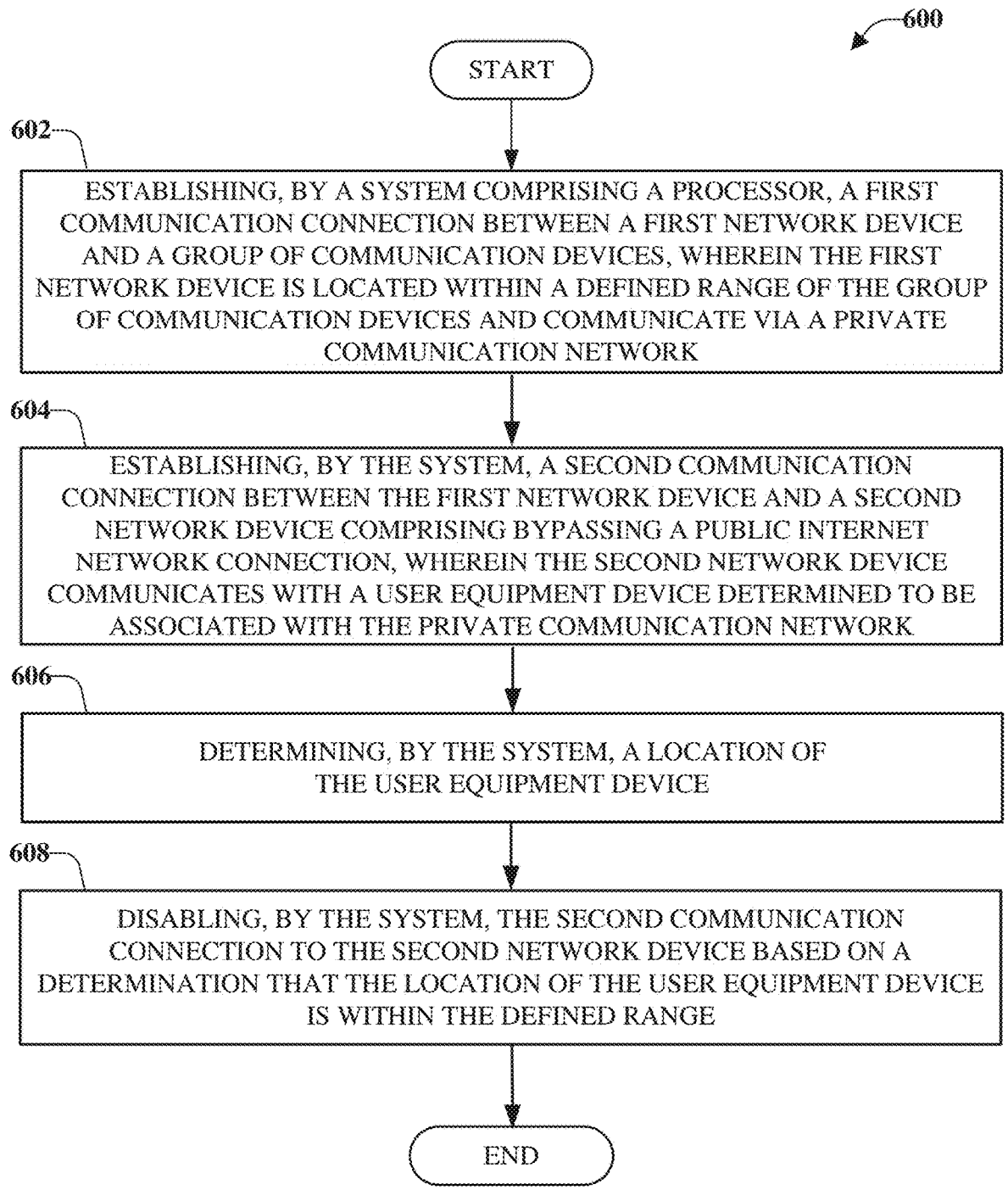
FIG. 6 illustrates a flow diagram of an example, non-limiting, computer-implemented method for changing a private network path based on a location of a communication device in advanced networks in accordance with one or more embodiments described herein.

FIG. 6 illustrates a flow diagram of an example, non-limiting, computer-implemented method 600 for changing a private network path based on a location of a communication device in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a system comprising a processor can establish a first communication connection between a first network device and a group of communication devices (e.g., via the first connection manager component 310). The first network device can be located within a defined range of the group of communication devices and can communicate via a private communication network. A second communication connection can be established by the system, at 604 of the computer-implemented method 600 (e.g., via the second connection manager component 312). The second communication connection can be between the first network device and a second network device. Further, based on establishment of the second communication connection, a public Internet connection can be bypassed. The second network device can communicate with a user equipment device determined to be associated with the private communication network.

At 606 of the computer-implemented method 600, a location of the user equipment device can be determined (e.g., via the location component 314). If the location of the user equipment device is within the defined range, at 608 of the computer-implemented method 600, the system can disable the second communication connection to the second network device (e.g., via the networking mode component 318).

For example, the user equipment device could be located away from a defined area (e.g., a location of a user's home, a business, or other location). When located away from the defined area, the connection between the first network device and the second network device (and/or subsequent network devices) can be established to bypass a public Internet connection while conveying data. Over time, the user equipment device could be moved to another location (away from the defined area), or could be brought into vicinity of the defined area. If, for example, the user equipment device is brought into the user's home (e.g., the user has returned home from work, from the store, from a vacation, and so on), the connection with the second network device (and/or subsequent network devices) is no longer needed and can be disabled or removed since the user equipment device can communicate with the devices in the group of device (e.g., directly or through the first network device).

Figure 7:
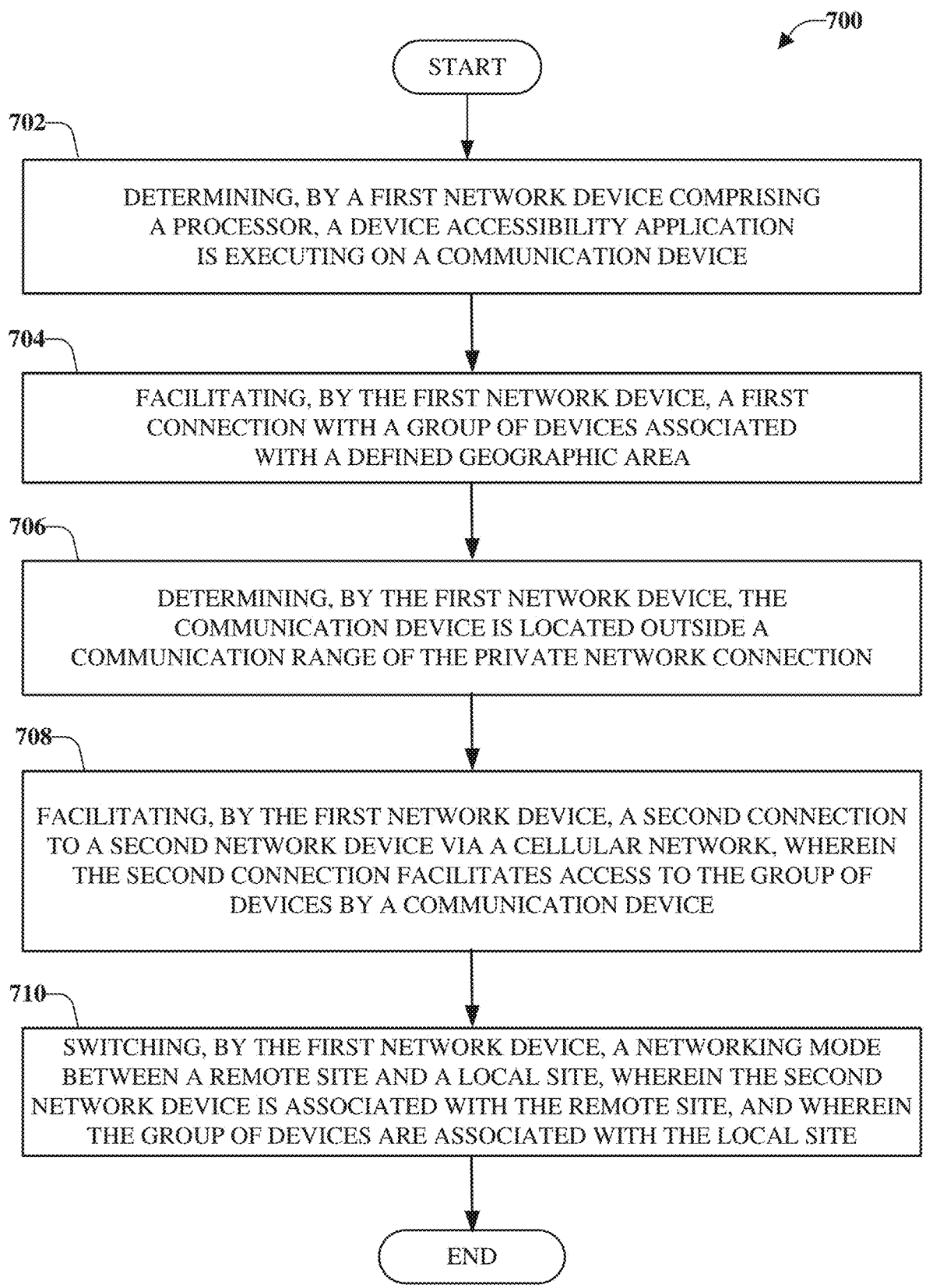
FIG. 7 illustrates a flow diagram of an example, non-limiting, computer-implemented method for switching communication between a remote site and a local site in advanced networks in accordance with one or more embodiments described herein.

FIG. 7 illustrates a flow diagram of an example, non-limiting, computer-implemented method 700 for switching communication between a remote site and a local site in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

A first network device comprising a processor can, at 702 of the computer-implemented method 700, determine a device accessibility application is executing on a communication device (e.g., via the analysis component 316).

At 704 of the computer-implemented method 700, the first network device can facilitate a first connection with a group of devices associated with a defined geographic area (e.g., via the first connection manager component 310). The group of devices and the first network device can be connected via a private network connection (e.g., a private home connection, a private office connection, and so on).

It can be determined, at 706 of the computer-implemented method 700 that the communication device is located outside a communication range of a provider network (e.g., via the location component 314). Based on this determination, a second connection to a second network device can be facilitated by the first network device at 708 of the computer-implemented method 700 (e.g., via the second connection manager component 312). The second connection to the second network device can be via a cellular network. In addition, the second connection can facilitate communication access to the group of devices by a communication device.

The computer-implemented method 700 can continue at 710, and the first network device can switch a networking mode between a remote site and a local site (e.g., via the networking mode component 318). The second network device can be associated with the remote site. Further, the group of devices can be associated with the local site.

Described herein are systems, methods, articles of manufacture, and other embodiments or implementations that can facilitate a geo-distributed dynamic network system for ubiquitous access to multiple private networks in advanced networks. Facilitating a geo-distributed dynamic network system for ubiquitous access to multiple private networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 6G network can be configured to provide more bandwidth than the bandwidth available in other networks (e.g., 4G network, 5G network). A 6G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 6G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 8:
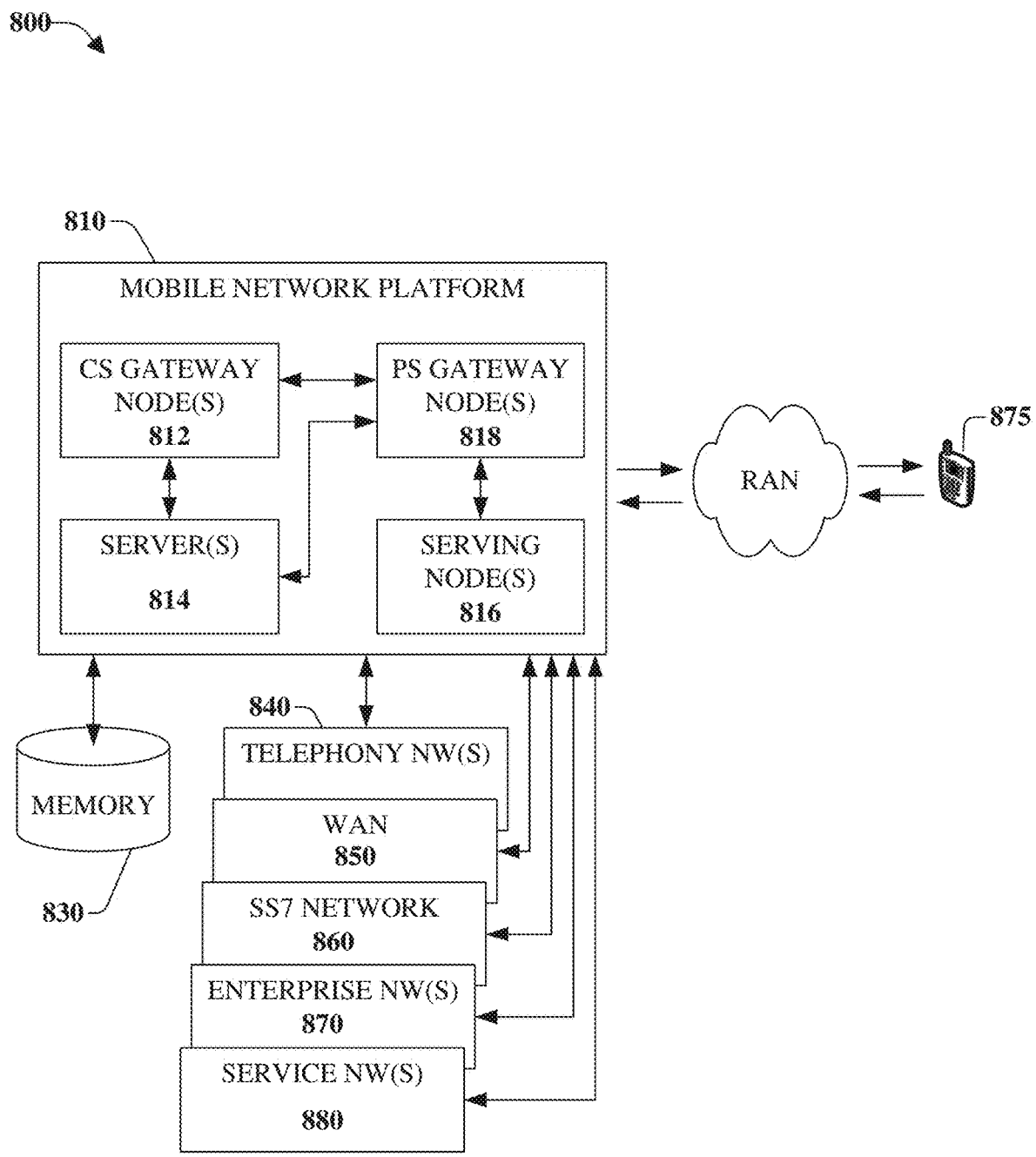
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks such as telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) such as IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processors can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
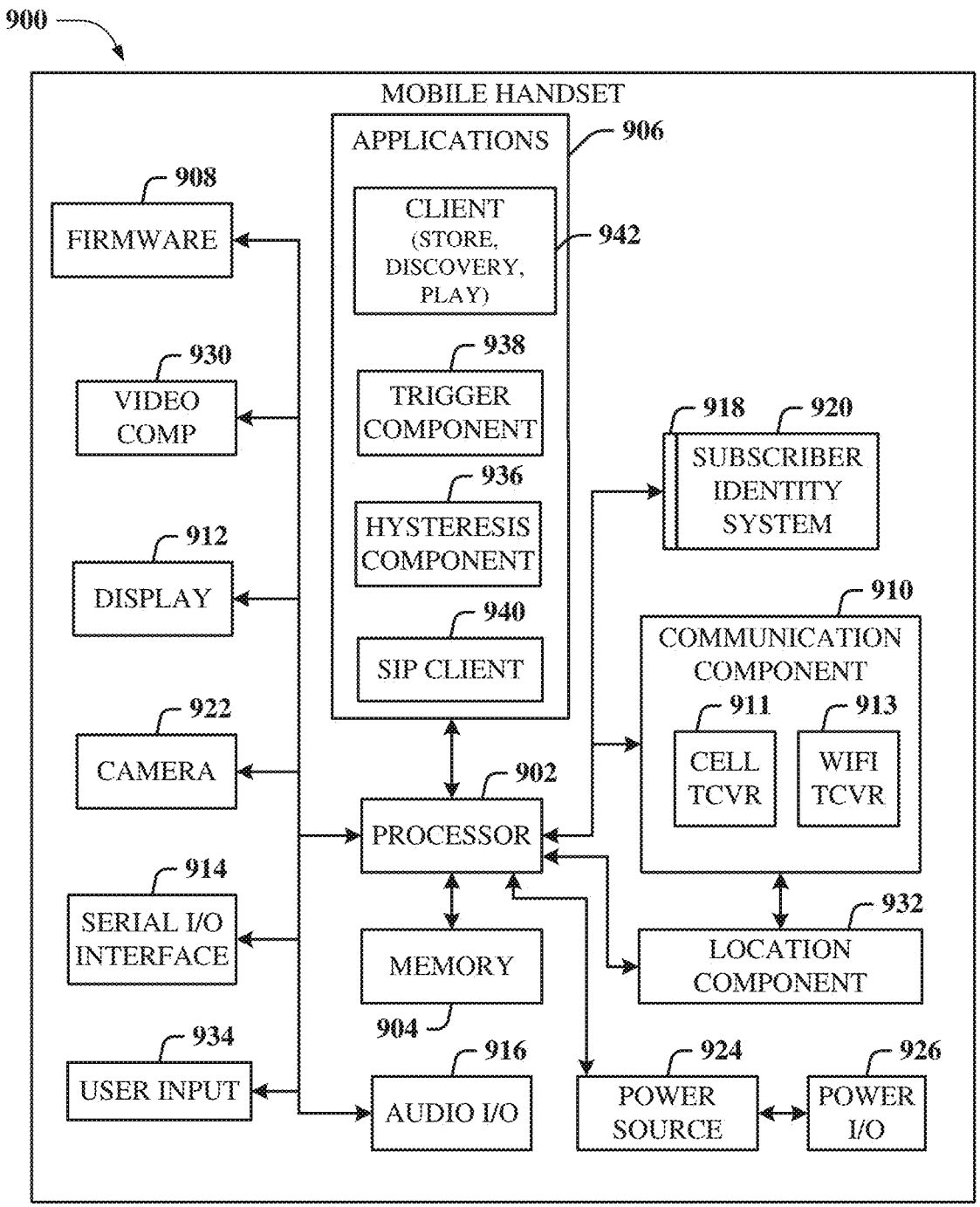
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
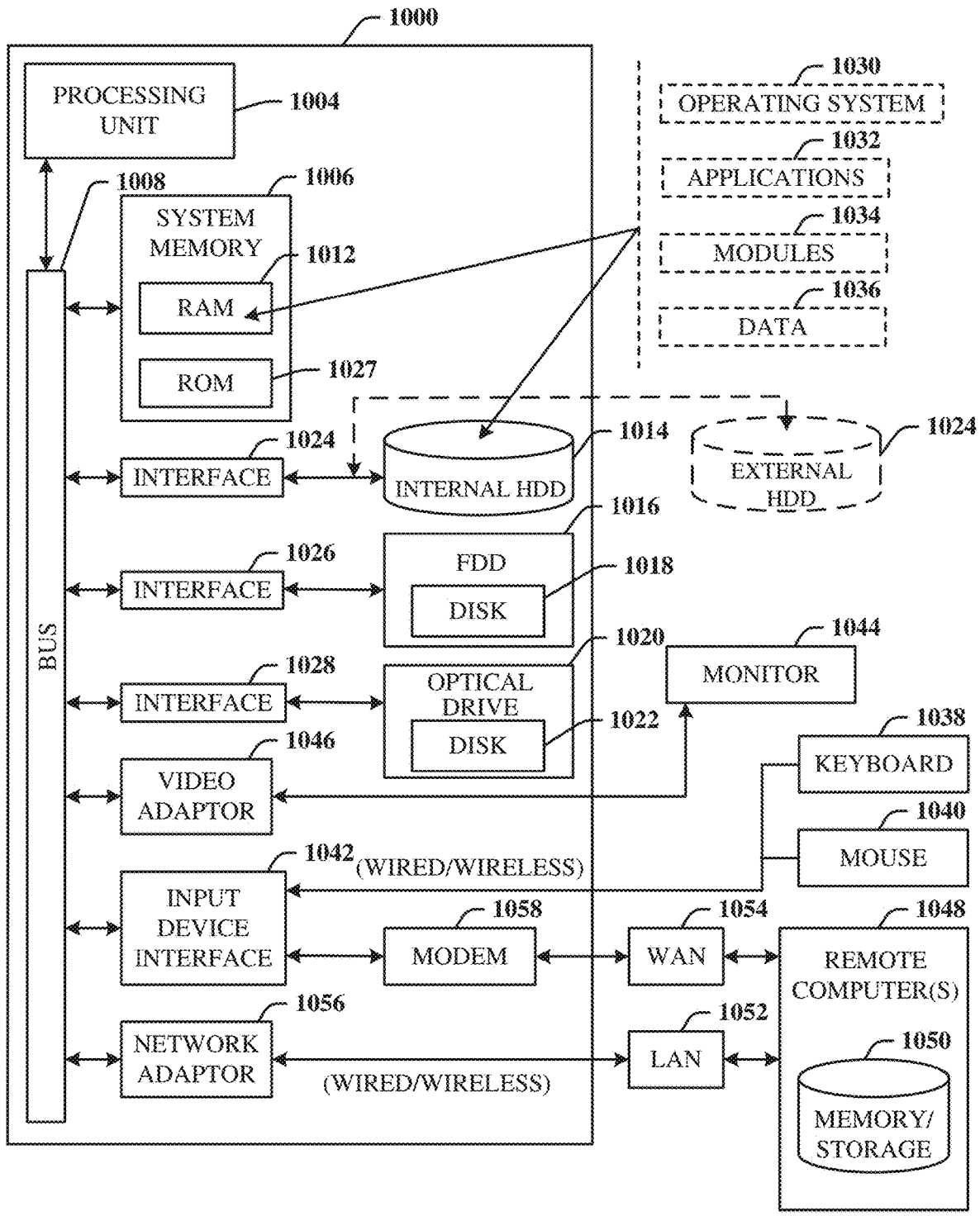
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random-access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer

1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at a 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a geo-distributed dynamic network system for ubiquitous access to multiple private networks are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
based on a first determination that a user equipment is located within a defined geographic area, allowing, by network equipment comprising a processor, the user equipment to access information from a device of a group of devices located within the defined geographic area, wherein the allowing is based on an identity, associated with a request for the access, being determined to be an authorized identity for the group of devices; and
based on a second determination that the user equipment is located outside of the defined geographic area, facilitating, by the network equipment, a connection of the user equipment to a gateway device, located within the defined geographic area, via a private network established using a cellular network comprising the network equipment, wherein the private network comprises a first network connection between the user equipment and edge network equipment that is part of the cellular network, and a second network connection between the edge network equipment and the gateway device.

2. The method of claim 1, further comprising:
facilitating, by the network equipment, establishing the private network, wherein facilitating the establishing comprises selecting the edge network equipment to use for the private network based on respective characteristics associated with different candidates for the edge network equipment comprised in the cellular network.

3. The method of claim 2, wherein the respective characteristics comprise respective latencies associated with using the edge network equipment.

4. The method of claim 1, further comprising:
obtaining, by the network equipment, the information from the device via the gateway device, wherein the private network bypasses communications, via a non-private network, with a cloud server or Internet server enabled with network services on behalf of the device and associated with a provider identity of a provider of the device.

5. The method of claim 1, wherein the group of devices has been previously registered with the gateway device.

6. The method of claim 1, wherein the private network is a first private network, wherein the connection is a first connection, and wherein the gateway device facilitates a second connection of the user equipment to the group of devices within the defined geographic area via a second private network using a local area network connection while the user equipment is within the defined geographic area.

7. The method of claim 1, wherein the private network facilities capability of the user equipment to obtain, in response to the request, the information from the gateway device, and wherein the gateway device previously obtained the information from the device of the group of devices.

8. The method of claim 1, wherein the gateway device is associated with a cellular network provider identity associated with the cellular network, and the cellular network provider identity is different than a device provider identity associated with a provider of the device.

9. The method of claim 1, wherein the device is classified as an Internet-of-Things device.

10. The method of claim 1, wherein the first network connection and the second network connection are network connections configured to operate according to a sixth generation wireless network communication protocol.

11. Network equipment, comprising:
a processor; and
a memory that stores executable instructions that, when executed by the processor, facilitate performance of operations, comprising:
determining that a request, received from a user equipment, for access to information from a device of a group of devices located within a defined geographic area, is authorized based on an identity associated with the request being determined to be an authorized identity for the group of devices and based on the user equipment being determined to be located within the defined geographic area; and
based on the user equipment, from which the request is received, being determined to be outside of the defined geographic area, enabling the user equipment to connect to a gateway device, located within the defined geographic area, via a private network established using a cellular network comprising the network equipment, wherein the private network comprises a first network connection between the user equipment and edge network equipment that is part of the cellular network, and a second network connection between the edge network equipment and the gateway device.

12. The network equipment of claim 11, wherein the group of devices has been previously registered with the gateway device.

13. The network equipment of claim 11, wherein the private network is a first private network, and wherein the gateway device facilitates the user equipment being connected to the group of devices within the defined geographic area via a second private network using a local area network connection while the user equipment is within the defined geographic area.

14. The network equipment of claim 11, wherein the second network connection enables the user equipment to obtain, in response to the request, the information from the gateway device, and wherein the gateway device previously obtained the information from the device of the group of devices.

15. The network equipment of claim 11, wherein the operations further comprise:
establishing the private network comprising selecting the edge network equipment to use for the private network based on respective characteristics associated with different candidates for the edge network equipment comprised in the cellular network.

16. The network equipment of claim 15, wherein the respective characteristics comprise respective latencies associated with using the edge network equipment.

17. The network equipment of claim 11, wherein the operations further comprise:
obtaining the information from the device via the gateway device, wherein the private network bypasses communications, via a non-private network, with a cloud server or Internet server enabled with network services on behalf of the device and associated with a provider identity of a provider of the device.

18. The network equipment of claim 11, wherein the gateway device is associated with a cellular network provider identity associated with the cellular network, and the cellular network provider identity is different than a device provider identity associated with a provider of the device.

19. A non-transitory machine-readable medium, comprising executable instructions that, when executed by a processor of network equipment, facilitate performance of operations, comprising:
determining that a request, received from a user equipment, for access to information from a device of a group of devices located within a defined geographic area, is authorized based on an identity associated with the request being determined to be an authorized identity for the group of devices, wherein the group of devices has been previously registered with a gateway device located within the defined geographic area, and wherein the gateway device is able to connect the user equipment to the group of devices within the defined geographic area via a first private network using a local area network connection while the user equipment is within the defined geographic area; and
in response to a determination that the user equipment, from which the request is received, is outside of the defined geographic area, enabling the user equipment to connect to the gateway device via a second private network established using a cellular network comprising the network equipment, wherein the second private network comprises a first network connection between the user equipment and edge network equipment that is part of the cellular network, and a second network connection between the edge network equipment and the gateway device, wherein the second private network enables the user equipment to obtain, in response to the request, the information from the gateway device, and wherein the gateway device previously obtained the information from the device of the group of devices.

20. The non-transitory machine-readable medium of claim 19, wherein the operations further comprise:
prior to the enabling, selecting the edge network equipment to use for the second private network based on respective characteristics associated with different candidates for the edge network equipment comprised in the cellular network, wherein the respective characteristics comprise respective latencies associated with using the edge network equipment.

* * * * *